No. 830,652. PATENTED SEPT. 11, 1906.
G. W. DURBROW.
PRESSURE FILTER.
APPLICATION FILED SEPT. 5, 1905.
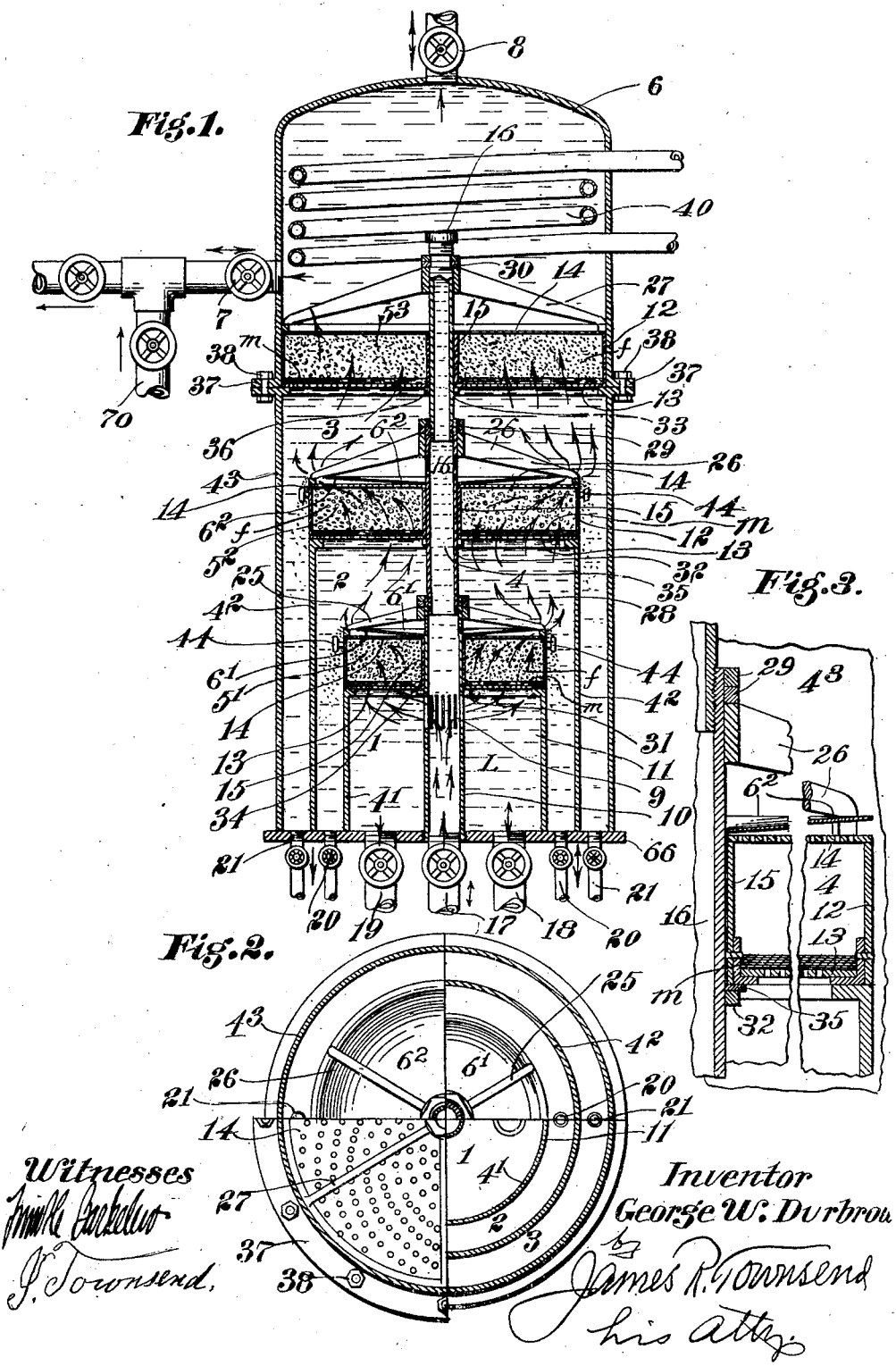
Witnesses
Inventor
George W. Durbrow
James R. Townsend
his atty.

UNITED STATES PATENT OFFICE.

GEORGE W. DURBROW, OF INDIO, CALIFORNIA, ASSIGNOR TO DURBROW FILTRATION COMPANY, OF YUMA, ARIZONA TERRITORY, A CORPORATION OF ARIZONA TERRITORY.

PRESSURE-FILTER.

No. 830,652.    Specification of Letters Patent.    Patented Sept. 11, 1906.

Application filed September 5, 1905. Serial No. 276,930.

*To all whom it may concern:*

Be it known that I, GEORGE W. DURBROW, a citizen of the United States, residing at Indio, in the county of Riverside and State of California, have invented a new and useful Pressure-Filter, of which the following is a specification.

An object of this invention is to provide a filter in which the liquid does not come into contact with the solids after they have been caused to separate from the liquid which carried them.

Another object is to provide novel and superior means for washing out the solids which may be deposited from time to time in the filter.

Another object of the invention is to provide convenient means for removing from the liquids solubles by the use of materials having an affinity for certain impurities carried in the liquid.

In the accompanying drawings I will illustrate the invention as applied with three superposed filter-cages and three sediment-chambers; but it is to be understood that there is no limitation as to the number of cages and chambers.

This filter comprises a container, a filter-body which divides the container into lower and upper compartments, means for supplying to the lower compartment liquid to be filtered, and means for drawing off or discharging filtered liquid from the upper compartment. Preferably means are also provided for drawing off or discharging impure liquid from the lower compartment. The outlets for such impurities may be valved and intermittently closed or constantly open, within the judgment of the constructor and operator for either intermittent or continuous discharge of impurities. It is to be understood that in case of unvalved impurity-outlets the same must be of such size relative to the main supply and discharge and the different heights thereof as may be necessary to maintain a required discharge at the clear-water outlet from the top compartment.

The accompanying drawings illustrate the invention.

Figure 1 is a vertical section of a filter embodying the invention. Fig. 2 is a fragmental horizontal section at different levels, showing sectors of the three filter-cages shown in Fig. 1 and also showing a portion of the lower sediment-chamber. Fig. 3 is an enlarged fragmental detail of the standard and a filter-body.

The filter comprises a series of filter, settling, or sediment chambers, as 1 2 3, each formed of an impervious wall, as $4'$ $4^2$ $4^3$, and a foraminous filter-top, as $5'$ $5^2$ $5^3$, said tops or filter bodies $5'$ $5^2$ $5^3$ being spaced vertically apart from each other. The chambers are contained one within another, and the wall $4^3$ of the outer chamber sustains a cage of filtering material $5^3$, which forms the top of said chamber. It will be seen that the upper filter-bodies $5^2$ and $5^3$ each overlap the filter-body next beneath, and chambers 2 and 3 include an annular sediment-receptacle adapted to receive sediment from the overlapping portion of a filter-body.

6 designates a holder above the filtering-top $5^3$ of the outer filtering-chamber, the same being detachably fastened to the top of the wall $4^3$ with a flanged liquid-tight joint.

66 is the floor or base of the filter and, together with wall $4^3$ and holder 6, forms the external container of the filter in which the chambers and filter-bodies are held. The holder 6 may be provided with valved openings, as 7 and 8, which may be used alternatively as clear-water outlets or as flushing-inlets.

9 indicates an inlet into the innermost sediment-chamber 1, said inlet being in the form of slots in the sides of a stand-pipe 10 close underneath the bottom of the first filter-cage $5'$, whereby the inflowing liquid will be directed radially outward from the pipe around all sides thereof, causing an agitation beneath the bottom of the filter-body and preventing any direct upward flow which might disturb the filtering material above or cause an unequal flow of the liquid through the filtering-body. The agitation and outward flow at the top of the first sediment-chamber 1 tends to carry all floating material to the perimeter of the chamber out of the way of the water to be purified.

$6'$ $6^2$, respectively, indicate impervious deflectors above the filtering-bodies $5'$ $5^2$, respectively, extending from the center upwardly and outwardly substantially to the perimeter of the filter-bodies, respectively, so that the top of the filter-body and its deflector diverge from each other outwardly. This allows free passage of the fluid with maximum current force to keep the impurities from settling on the filter-top, so that the liquid, after passing from a filter-body must flow outward to the side walls of such body and any solids which might deposit as sediment will be carried to the side walls of the filter-body through which it has passed and there allowed to settle from the liquid, which must at that point turn from a horizontal to an upward course, thus causing precipitation at that point. A deflector of this kind may be placed above any of the filter-bodies except the uppermost, where it is not necessary or desirable. Each of the filter-bodies is preferably constructed in the form of a cage filled with filtering material, said cage being composed of an imperforate wall 12 and a foraminous bottom and top 13 14. In the cylindrical form of filter the walls 12 may be in the form of hoops, and the bottom and top 13 14 of the cage may be a perforated plate or wire screen.

15 indicates a centrally-arranged tube in each filter-body to fit on a standard 16, formed by the stand-pipe 10 and a capped upward extension of the stand-pipe 10. The stand-pipe may be connected with a pressure main (not shown) and provided with a valve 17.

18 and 19 designate valved flushing-outlets from the chamber 1.

20 designates flushing-outlets from the chamber 2.

21 designates flushing-outlets from the chamber 3. Double-headed arrows are shown in Fig. 1 at some of the outlets 20 and 21 to indicate that said outlets may be connected to supply water for flushing purposes.

25, 26, and 27 designate spiders above the filter-bodies $5'$ $5^2$ $5^3$ for holding the same in place, said spiders being mounted on the standard 16, which includes pipe 10 and is formed in sections of successively-decreasing diameters from the bottom upward, thus allowing several spiders to be held in place by nuts 28, 29, and 30, respectively, which are of different diameters, the lower one being of sufficient diameter to pass freely over the section of the standard above the screw-threads upon which said nuts are to be screwed to hold its spider in place. Said standard is also provided with shoulders 31, 32, and 33, upon which washers 34, 35, and 36 are supported to close the passage between the tubes 15 and the standard 16, and also to serve as a support for the center of the filter-body.

The holder 6 may be fastened by flanges and bolts 37 38, and removed whenever it is desirable to gain access to the interior of the filter.

The superposed filter-bodies $5'$ $5^2$ $5^3$ may be of any suitable material. It is obvious that the character of the several bodies may vary as occasion may demand. The lower body $5'$ may be made of coarser and the upper bodies of finer filtering materials, if deemed advisable, or vice versa, and the upper body $5^3$ may be made of material having an affinity for solubles contained in the liquid to be filtered, and is readily removed when it becomes charged.

The outlet-pipes 7 and 8 may have valved connection with a main 70, so that liquid may be turned into the top of the filter for flushing the same. To cleanse the filter from time to time, the valves will be manipulated so that pipes 7, 8, and 9 will be opened from the main and the other pipes closed, except the flush-pipes from that sediment-chamber which is to be flushed. Thus the liquid may be caused to flow with force downward through the filter-bodies and chamber 1 to flush the same through outlets 18 and 19. When this flushing is completed, the outlets 18 and 19 may be closed and the outlets 20 opened, whereupon the flushing action takes place through the chamber 2. When the flushing of chamber 2 is completed, the outlets 20 therefrom may be closed and the outlets 21 from chamber 3 be opened, so that flushing in chamber 3 will take place.

It will be noted that by the construction shown floating material and sediment will be deposited at such places that the flowing liquid will not come in contact with the deposits except in the process of flushing and that then the liquids will flush the same out in the most efficient manner. It is evident that by admitting liquid through pipe 18 while outlet 19 is open a current for washing sediment from floor 66 will be produced.

40 designates a cooling-coil for ammonia or brine, the same being arranged in the holder 6, so that by passing the ammonia or brine through the coil water in the holder 6 may be constantly cooled.

44 designates handles on the filter-cages for the purpose of removing the same from the chambers in which they are contained.

$m$ designates an asbestos filter-mat between the loose filter material $f$ and the liquid to be filtered. This mat at once intercepts most of the slimes and filth and precipitates the same instead of allowing such matter to enter the main filter-body, which is preferably of loose material, as sand, gravel, charcoal, and the like.

The inlet 9 to the filter is preferably at the center of the lower compartment and arranged to direct the liquid horizontally toward the perimeter of the compartment just below the mat, so that the current of liquid will tend to carry the floating impurities outward from and prevent them from accumulating on the mat.

It will be seen that in the present embodiment the invention comprises a filtering apparatus including a horizontal bottom 66 and an intermediate container resting on said bottom, said container being provided with a filtering-body 52, closing the top thereof, an inside container inclosed by said intermediate container, and of a construction corresponding thereto, said inside container being spaced apart from said intermediate container both vertically and laterally to form an annular chamber 2, and an outside container inclosing said intermediate container and spaced apart therefrom both at the sides and top, there being annular sediment-chambers 2 and 3 on the inside and on the outside of the walls of the intermediate container, each of said sediment-chambers being adapted to receive sediment from the filtering-bodies $5^2$ and $5^3$, respectively, thereabove. Means consisting of a pipe 17 supplies liquid to the container, and pipes controlled by valves 7 and 8 withdraw liquid after it has passed through the filter-body of the outside container.

What I claim is—

1. A filtering apparatus including a bottom and an intermediate container resting on said bottom, said container being provided with a filtering-body closing the top thereof, and an inside container inclosed by said intermediate container and of a construction corresponding thereto, said inside container being spaced apart from said intermediate container both vertically and horizontally, and an outside container inclosing said intermediate container and spaced apart therefrom both at the sides and top, there being an annular sediment-chamber on the inside and on the outside of the walls of the intermediate container, each of said sediment-chambers being adapted to receive sediment from the filtering-bodies respectively thereabove, means for supplying liquid to the inner container and withdrawing liquid after it has passed through the filter-body of the outside container.

2. A filtering apparatus including in combination, a bottom and two containers one within the other resting upon said bottom, there being an annular space between the walls of said containers, the upper ends of each of said containers containing a filter-body, the filter-body of the outer container being spaced vertically apart from the filter-body of the inner container and extending vertically over said annular space, and means for preventing sediment from falling upon the filter-body of the inner container.

3. A filtering apparatus including, in combination, a substantially horizontal bottom and two containers, one within the other resting upon said bottom, there being an annular space between the walls of said containers, the upper ends of each of said containers containing a filter-body, the filter-body of the outer container being spaced vertically apart from the filter-body of the inner container and extending vertically over said annular space, and a deflector for preventing sediment from falling upon the filter-body of the inner container.

4. A filter comprising a chamber, a filter-body to allow passage of fluid from said chamber, a filter-body in said chamber, means for directing fluid up through said filter-bodies, and an impervious deflector above said inner filter-body to cause the fluid to flow to the edge of said inner filter-body, after passing through the same.

5. A filter comprising a plurality of chambers one within the other, a centrally-arranged standard in said chambers, filter-bodies on the walls of the chambers closing the tops of the same, spiders on the filter-bodies respectively, and nuts on the standard for forcing the spiders down on the filter-bodies respectively, said standard extending upwardly through all the filter-bodies.

6. A plurality of filter-chambers having filter-bodies at their tops respectively, one chamber being within another, and a deflector over the filter-top of the inner chamber and extending substantially to the perimeter of said top, a passage being provided outside the rim of the deflector between it and the walls of the chamber.

7. A plurality of filter-chambers having filter-bodies at their tops respectively, one chamber being within another, and a deflector over the filter-top of the inner chamber and extending from the center upwardly and outwardly substantially to the perimeter of the filter-body, a space being left between the sides of the deflector and the wall of the outer chamber.

8. A filter comprising a plurality of chambers one within another, each provided with a filter-body at its top, and a deflector over the top of the inner filter-body, the deflector and the top of said inner filter-body diverging from each other outwardly.

9. A filter provided with a bottom, a pipe fastened in said bottom and terminating in a standard, a valved inlet for said pipe, an outlet from said pipe above said bottom, a chamber surrounding said pipe and provided with a filter-body at the top, outlets from said pipe being provided near the bottom of said filter-body, and one or more other chambers surrounding said first-named chamber and respectively provided with filter-tops surrounding said standard, means connected with said standard for holding the filter-tops in place, and sediment-deflectors one covering each of said tops.

10. A filtering apparatus including a bottom and an intermediate container resting on said bottom, said container being provided with a filtering-body closing the top thereof, and an inside container inclosed by said intermediate container and of a construction corresponding thereto, said inside container being spaced apart from said intermediate container both vertically and horizontally, and an outside container inclosing said intermediate container and spaced apart therefrom both at the sides and top, there being an annular sediment-chamber on the inside and on the outside of the walls of the intermediate container, each of said sediment-chambers being adapted to receive sediment from the filtering-bodies respectively thereabove, means for supplying liquid to the inner container and withdrawing liquid after it has passed through the filter-body of the outside container, and means for drawing off or discharging impurities from the sediment-chambers.

11. A filtering apparatus including in combination, a bottom and two containers one within the other resting upon said bottom, there being an annular space between the walls of said containers, the upper ends of each of said containers containing a filter-body, the filter-body of the outer container being spaced vertically apart from the filter-body of the inner container and extending vertically over said annular space, means for drawing off or discharging impurities from said annular space, and means for preventing sediment from falling upon the filter-body of the inner container.

In testimony whereof I have hereunto set my hand, at Los Angeles, California, this 26th day of August, 1905.

GEORGE W. DURBROW.

In presence of—
JAMES R. TOWNSEND,
JULIA TOWNSEND.